(12) United States Patent
Lovasz

(10) Patent No.: US 8,191,971 B2
(45) Date of Patent: Jun. 5, 2012

(54) SEAT TRIM ASSEMBLY

(75) Inventor: Eric Lovasz, Southgate, MI (US)

(73) Assignee: Lear Corporation, Southfield, MI (US)

( * ) Notice: Subject to any disclaimer, the term of this patent is extended or adjusted under 35 U.S.C. 154(b) by 96 days.

(21) Appl. No.: 12/725,552

(22) Filed: Mar. 17, 2010

(65) Prior Publication Data

US 2011/0227390 A1 Sep. 22, 2011

(51) Int. Cl.
*A47C 7/02* (2006.01)

(52) U.S. Cl. ............................ 297/452.6; 297/452.59

(58) Field of Classification Search ............ 297/452.48, 297/452.52, 452.53, 452.58, 452.6; 24/265 R, 24/301, 300, 298, 302, 299
See application file for complete search history.

(56) References Cited

U.S. PATENT DOCUMENTS

| | | | |
|---|---|---|---|
| 3,630,572 A | 12/1971 | Homier | |
| 3,848,926 A | 11/1974 | Kuroishi | |
| 3,961,823 A | 6/1976 | Caudill, Jr. | |
| 4,470,179 A | 9/1984 | Gollin et al. | |
| 4,508,220 A | 4/1985 | Pearson | |
| 5,320,269 A | 6/1994 | Deschenes et al. | |
| 5,388,749 A | 2/1995 | Davignon et al. | |
| 5,605,373 A | 2/1997 | Wildern, IV et al. | |
| 5,641,552 A | 6/1997 | Tillner | |
| 5,683,025 A | 11/1997 | Grendol | |
| 5,733,001 A | 3/1998 | Roberts | |
| 5,820,213 A | 10/1998 | Severinski | |
| 5,896,720 A | 4/1999 | Bond | |
| 5,964,017 A | 10/1999 | Roberts | |
| 5,971,478 A | 10/1999 | Hurite | |
| 6,299,255 B1 | 10/2001 | Pichon | |
| 6,478,209 B1 | 11/2002 | Bruins et al. | |
| 6,568,761 B2 | 5/2003 | Perske et al. | |
| 6,668,429 B2 | 12/2003 | Fujisawa et al. | |
| 6,698,641 B2 | 3/2004 | Flannery et al. | |
| 6,899,399 B2 | 5/2005 | Ali et al. | |
| 6,964,453 B1 | 11/2005 | Flegal et al. | |
| 7,287,305 B2 | 10/2007 | Bednarski | |
| 7,487,575 B2 | 2/2009 | Smith | |
| 7,506,939 B2 * | 3/2009 | Brockschneider et al. | 297/452.6 |
| 7,517,577 B2 | 4/2009 | Pedde et al. | |
| 7,559,100 B2 | 7/2009 | Pedde et al. | |
| 7,585,025 B2 | 9/2009 | Welch et al. | |
| 7,815,992 B2 | 10/2010 | Pedde et al. | |
| 8,099,837 B2 | 1/2012 | Santin et al. | |
| 2002/0101109 A1 | 8/2002 | Stiller et al. | |

(Continued)

FOREIGN PATENT DOCUMENTS

DE 7317520 U 3/1974

(Continued)

OTHER PUBLICATIONS

U.S. Appl. No. 12/574,027, filed Oct. 6, 2009, Ashford A. Galbreath et al.

(Continued)

*Primary Examiner* — Milton Nelson, Jr.
(74) *Attorney, Agent, or Firm* — Brooks Kushman P.C.

(57) ABSTRACT

A seat trim assembly including a cushion and a retention clip. The retention clip includes first and second retention portions and a flexible arm. The first and second retention portions are adapted to engage a trim cover assembly. The flexible arm connects the first and second retention portions and has a serpentine configuration that facilitates flexing of the retention clip.

20 Claims, 4 Drawing Sheets

U.S. PATENT DOCUMENTS

| | | | |
|---|---|---|---|
| 2003/0001421 A1* | 1/2003 | Schmidt | 297/452.6 |
| 2003/0215601 A1 | 11/2003 | Pedde et al. | |
| 2005/0006944 A1 | 1/2005 | Ali et al. | |
| 2005/0150090 A1 | 7/2005 | Pedde et al. | |
| 2006/0061192 A1* | 3/2006 | Flegal et al. | 297/452.6 |
| 2008/0048474 A1 | 2/2008 | Pedde et al. | |
| 2008/0258523 A1 | 10/2008 | Santin et al. | |
| 2009/0085384 A1 | 4/2009 | Galbreath et al. | |
| 2009/0096274 A1 | 4/2009 | Pedde et al. | |
| 2009/0295215 A1 | 12/2009 | Galbreath et al. | |
| 2010/0117434 A1 | 5/2010 | Galbreath et al. | |
| 2011/0227390 A1 | 9/2011 | Lovasz | |

FOREIGN PATENT DOCUMENTS

| | | | |
|---|---|---|---|
| DE | 69310593 T2 | 12/1997 | |
| DE | 29821697 U1 | 2/1999 | |
| DE | 29822649 U1 | 4/1999 | |
| DE | 20100848 U1 | 3/2001 | |
| DE | 10019798 A1 | 11/2001 | |
| DE | 202004017050 U1 | 1/2005 | |
| DE | 202005008952 U1 | 8/2005 | |
| DE | 202005013339 U1 | 11/2005 | |
| DE | 102006020306 A1 | 11/2007 | |
| DE | 102007037867 A1 | 6/2008 | |
| DE | 102009046551 A1 | 5/2010 | |
| EP | 1220628 A1 | 7/2002 | |
| GB | 2328708 A | 3/1999 | |
| JP | 2691457 B2 | 12/1997 | |
| WO | 02054917 A2 | 7/2002 | |
| WO | 2008017360 A1 | 2/2008 | |

OTHER PUBLICATIONS

German Patent and Trademark Office, German Office Action for German Patent Application No. 10 2010 062 445.4-15 mailed Mar. 14, 2011.

* cited by examiner

SEAT TRIM ASSEMBLY

BACKGROUND OF THE INVENTION

Field of the Invention

The present invention relates to a seat trim assembly that may be used to secure a trim cover.

SUMMARY OF THE INVENTION

In at least one embodiment, a seat trim assembly is provided. The seat trim assembly includes a cushion and a retention clip disposed proximate the cushion. The retention clip includes a flexible arm and first and second retention portions that are adapted to engage a trim cover assembly. The flexible arm connects the first and second retention portions and has a serpentine configuration that includes a plurality of curved regions that facilitate flexing of the retention clip.

In at least one embodiment, a seat trim assembly is provided. The seat trim assembly includes a cushion and a retention clip. The retention clip includes first and second retention portions adapted to engage a trim cover assembly. First and second arms extend from the first retention portion. Third and fourth arms extend from the second retention portion. A first serpentine arm extends from the first arm to the third arm. A second serpentine arm extends from the second arm to the fourth arm. The first and second serpentine arms each have a set of curved regions that facilitate flexing of the retention clip.

In at least one other embodiment, a seat trim assembly is provided that includes a cushion having an opening and a retention clip disposed in the opening. The retention clip has a first portion that includes first and second pads disposed along a base axis. First and second retention features extend from the first and second pads and are adapted to engage a trim cover. First and second pairs of arms extend from the first and second pads, respectively. First and second serpentine arms extend between the first and second pairs of arms and have a set of curved portions. At least some members of the set of curved portions of the first serpentine arm are configured to be disposed closer together than members of the set of curved portions of the second serpentine arm when the base axis is disposed along an arc.

DETAILED DESCRIPTION

Figure 1:
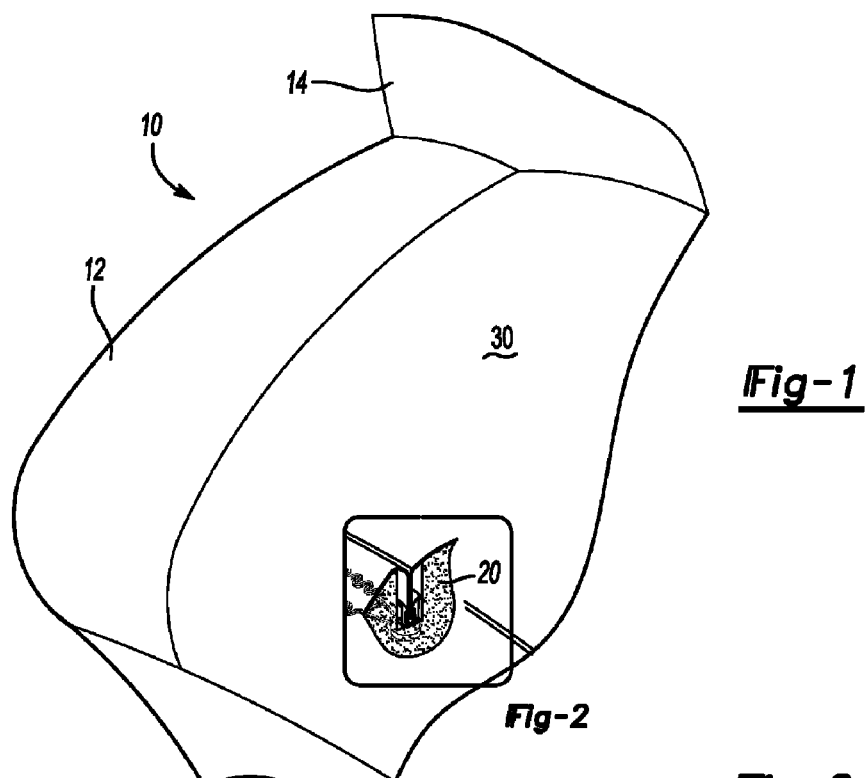
FIG. 1 is a fragmentary perspective view of a portion of a seat assembly having a trim cover assembly.
Figure 2:
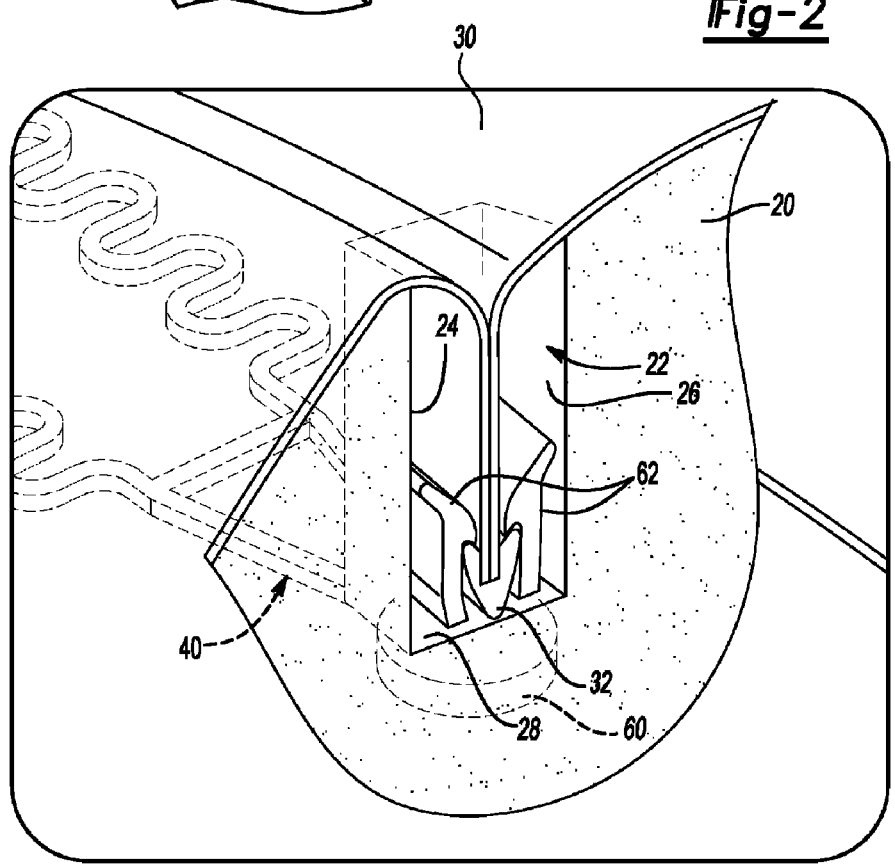
FIG. 2 is a magnified view of a portion of the seat assembly including an embodiment of a retention clip.

Referring to FIGS. 1 and 2, a portion of a seat assembly 10 is shown. The seat assembly 10 may be provided with a vehicle, such as a car or truck. In addition, the seat assembly 10 may be configured for non-vehicular applications.

The seat assembly 10 may include a seat bottom 12 and a seat back 14. In a vehicular application, the seat bottom 12 may be moveably disposed on a support surface. The seat back 14 may be pivotally disposed on the seat bottom 12 in a manner known by those skilled in the art. The seat bottom 12 and the seat back 14 may include a support structure, such as a seat frame, seat pan, and/or support wires.

A cushion 20 may be supported by the support structure. The cushion 20 may be made of any suitable material, such as foam. The cushion 20 may include at least one opening 22. The opening 22 may be a recess, such as a hole, trench, or elongated channel, that is provided in the cushion 20. The opening 22 may be at least partially defined by one or more surfaces. For instance, the opening 22 may be at least partially defined by first and second side surfaces 24, 26 and/or a bottom surface 28 that may extend between the first and second side surfaces 24, 26 as is best shown in FIG. 2.

At least one trim cover assembly 30 may be provided with the seat assembly 10. The trim cover assembly 30 may be disposed over the cushion 20 and may comprise an exterior surface of the seat assembly 10 upon which a seat occupant may be disposed when in a seated position. The trim cover assembly 30 may include one or more trim panels that may be made of any suitable material, such as fabric, leather, vinyl, or combinations thereof.

The trim cover assembly 30 may also include at least one engagement feature 32. The engagement feature 32 may help secure the trim cover assembly 30 to the seat assembly 10 to hold the trim cover assembly 30 in a desired position to inhibit folding, puckering, or wrinkling of the trim cover assembly 30, which may have an undesirable aesthetic appearance. The engagement feature 32 may have any suitable configuration, such as a male configuration, female configuration, or combinations thereof. In addition, the engagement feature 32 may be provided in any suitable location. For example, the engagement feature 32 may be provided proximate an end or edge of one or more trim cover panels. In addition, the engagement feature 32 may include a panel or wall that facilitates attachment to one or more trim cover panels. The engagement feature 32 may be coupled to the trim cover assembly 30 in any suitable manner, such as with stitching, bonding, or an adhesive. Moreover, the engagement feature 32 may be made of any suitable material, such as a polymeric material.

Figure 3:
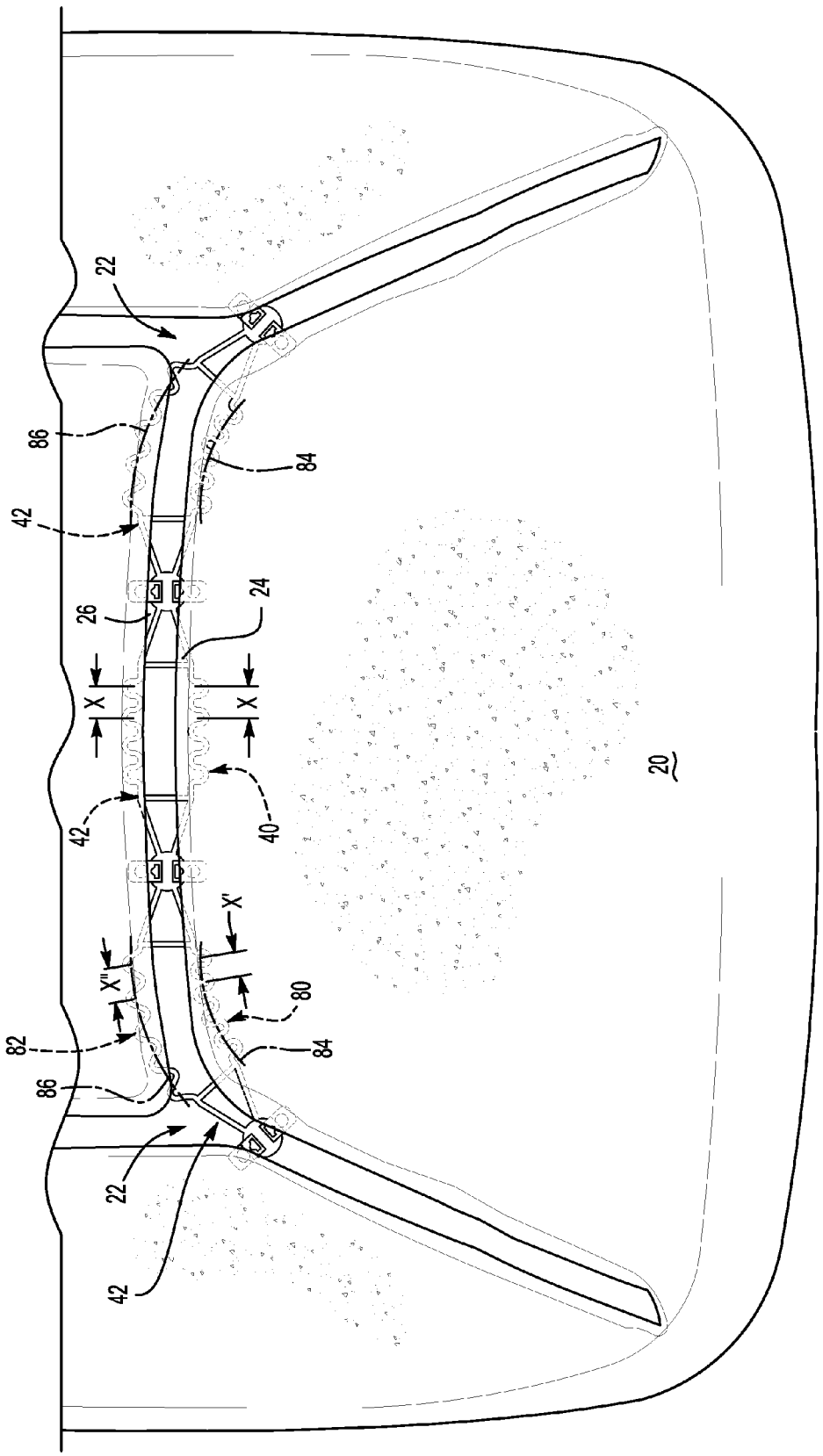
FIG. 3 is a top view of the embodiment of the retention clip shown in FIG. 2 disposed in a cushion.
Figure 4:
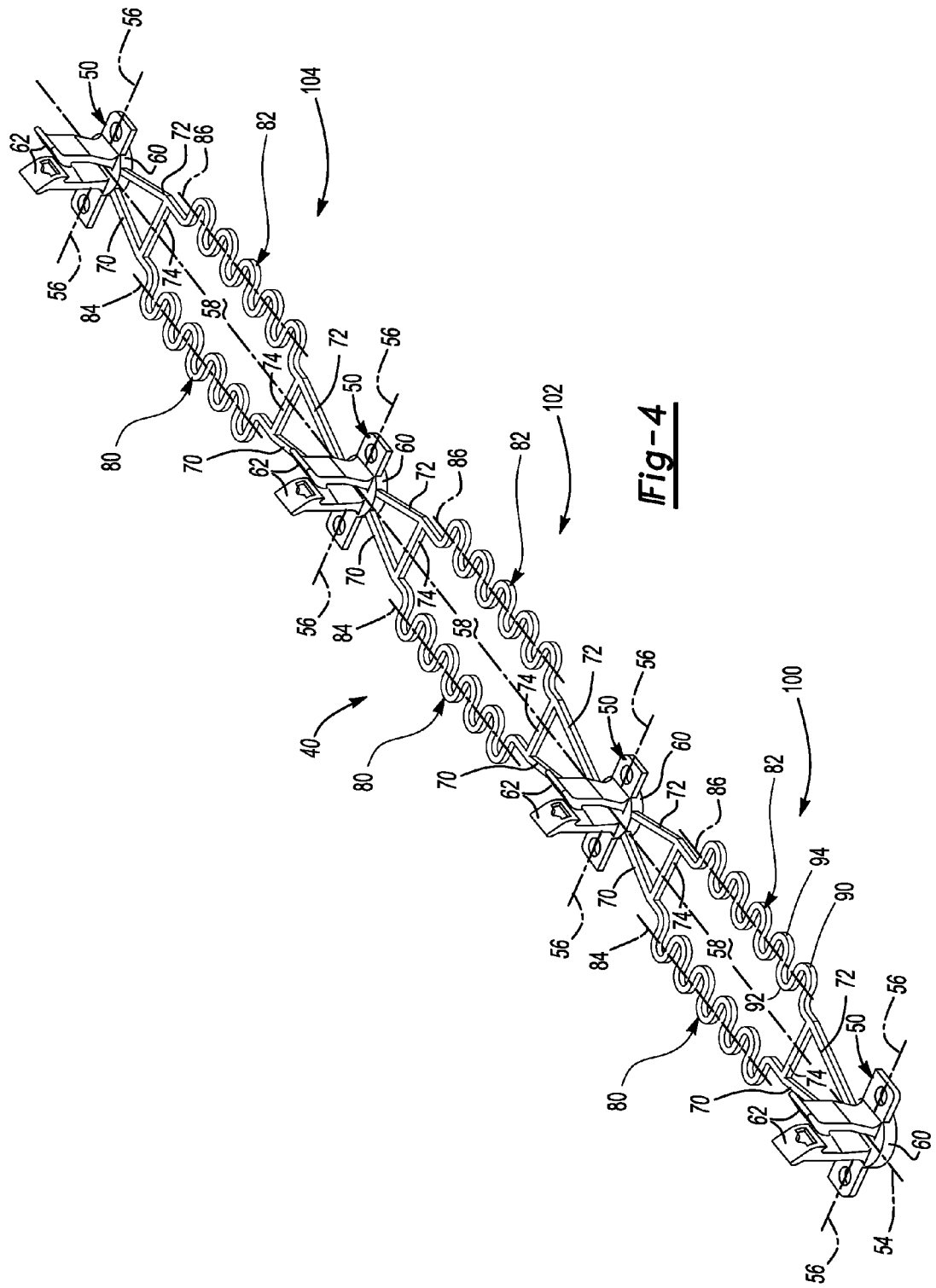
FIG. 4 is a perspective view of the retention clip shown in FIG. 2.

The seat assembly 10 may also include at least one retention clip. An exemplary embodiment of a retention clip 40 is shown in FIGS. 2-4. The retention clip 40 may be configured to engage one or more engagement features 32 to provide localized retention of the trim cover assembly 30. The retention clip 40 may be at least partially disposed in the cushion 20. In addition, the retention clip 40 may be at least partially disposed in the opening 22 as will be discussed in more detail below.

The retention clip 40 may include a base 42. The base 42 may act as a footing and may be disposed at least partially in the cushion 20. In at least one embodiment, the base 42 may be disposed under the bottom surface 28 of the opening 22. As such, the base 42 may distribute load forces and provide sufficient surface area to enhance bonding to the cushion 20 to inhibit dislocation or removal of the retention clip 40 from the cushion 20.

The base 42 may include one or more retention portions 50. For example, first and second retention portions 50 may be spaced apart from each other and may be disposed along a first base axis 54. A second base axis 56 may be disposed coplanar with and extend substantially perpendicular to the first base axis 54. Each retention portion 50 may be configured to receive or engage the trim cover assembly 30 or a portion thereof, such as an engagement feature 32.

One or more openings 58 may be provided with the base 42 to facilitate installation of the trim cover assembly 30. For instance, the base 42 may include or at least partially define one or more openings 58 through which a trim cover installation tool may be inserted. The trim cover installation tool may engage and pull the trim cover assembly 30 toward and into engagement with the retention clip 40. In addition, the openings 58 may be disposed along or may be bisected by the first base axis 54 when the retention clip 40 is in a first or unflexed position.

In at least one embodiment, a retention portion 50 may include a pad 60 and/or one or more retention features 62. The retention feature 62 may have any suitable configuration. In the embodiment shown, the retention feature 62 is configured as a pair of spaced apart barbs that extend from the pad 60. The barbs may be configured to flex away from each other to receive the trim cover assembly 30 and/or engagement feature 32 in a snap-fit arrangement. The retention feature 62 may extend through the cushion 20 and into the opening 22 as is best shown in FIG. 2. In the embodiment shown, the retention features 62 are provided on opposite sides of first base axis 54. The first and second base axes 54, 56 may intersect at substantially the center of the pad 60. As such, the first and second base axes 54, 56 may substantially bisect the pad 60.

The base 42 may also include first and second arms 70, 72. The first and second arms 70, 72 may extend from and may be disposed substantially coplanar with each pad 60. In addition, the first and second arms 70, 72 may be spaced apart from each other, may be substantially linear, and may be oriented along axes that intersect at a point, such as at or near the center of a respective pad 60.

The first and second arms 70, 72 may be provided at an angle, such as an acute angle, with respect to each other. In addition, the first and second arms 70, 72 may be provided at an angle with respect to the first and second base axes 54, 56. As such, the first and second arms 70, 72 may be configured such that at least a portion of the base 42 is wider than the opening 22 in the cushion 20. For example, the base 42 may be provided with a width that is greater than the width or distance between the first and second surfaces 24, 26 of the opening 22 as is best shown in FIGS. 2 and 3.

At least one connecting member 74 may extend between the first and second arms 70, 72. In at least one embodiment, the connecting member 74 may be provided at or near distal ends of the first and second arms 70, 72. The connecting member 74 may be substantially linear, may be spaced apart from the pad 60 and/or the second base axis 56, and may be disposed substantially coplanar with the first and second arms 70, 72. The connecting member 74 may help provide structural reinforcement and generally maintain the positioning of the first and second arms 70, 72 with respect to each other.

First and second serpentine arms 80, 82 may also be provided with the base 42. The first serpentine arm 80 may extend from and/or between the first arms 70. The second serpentine arm 82 may extend from and/or between the second arms 72. In addition, the first and second serpentine arms 80, 82 may be substantially coplanar with the first and second arms 70, 72.

The first and second serpentine arms 80, 82 may be spaced apart from each other and from the first base axis 54. In addition, the first and second serpentine arms 80, 82 may be disposed about, along, or with respect to first and second arm axes 84, 86, respectively. The first and second arm axes 84, 86 may be disposed substantially parallel to each other when the serpentine arms 80, 82 are in a first or unflexed position as shown in FIG. 4. In addition, the arm axes 84, 86 may bisect or be disposed along a respective serpentine arm 80, 82 when the serpentine arms are disposed in the first position.

The serpentine arms 80, 82 may include a set of curved portions. The set of curved portions may include one or more curved portions or curved walls that may be configured to bend or flex to permit at least a portion of the retention clip 40 to be disposed in a nonlinear arrangement, such as along a curve or arc. The set of curved portions may be arranged in a repeating pattern. For instance, adjacent members of the set of curved portions may be disposed along and on opposite sides of the arm axes 84, 86. As such, curved portions may face or be oriented in different or opposite directions. By way of example, the first and/or second serpentine arms 80, 82 may include a first curved portion 90, a second curved portion 92, and a third curved portion 94. The first and third curved portions 90, 94 may be disposed on a first side of the arm axis 84. The second curved portion 92 may be disposed on an opposite side of the arm axis 84. Opposing first and second ends of the second curved portion 92 may be disposed adjacent to and extend from the first and third curved portions 90, 94, respectively. As such, the first and third curved portions 90, 94 may each have a curved surface that is oriented in a common direction and may define or partially enclose an opening that may also face in a common direction, such as toward the first base axis 54. The second curved portion 92 may also have a curved surface and may define an opening that may face in a different direction, such as away from the first base axis 54.

The serpentine arms 80, 82 and set of curved portions may allow the retention clip 40 to flex. For instance, the set of curved portions may move between a first or initial position as shown in FIG. 4 and in the center of FIG. 3 to an exemplary second or flexed position as shown with other portions of the retention clip 40 shown in FIG. 3. In the second position, the retention clip 40 or a portion thereof may be disposed along at least one arc or radius of curvature. The retention clip 40 may be held in this position by engagement with the cushion 20 and/or trim cover assembly 30. The curved portions of the first and second serpentine arms 80, 82 may be disposed in different positions when the retention clip 40 or a portion thereof is flexed or disposed in a second position.

One or more members of the set of curved portions of the first serpentine arm 80 may be biased or moved toward each other while one or more members of the set of curved portions of the second serpentine arm 82 may be biased or moved apart from each other when the retention clip 40 is moved from the first position to the second position. This is depicted in FIG. 3, in which two curved portions are disposed a distance X apart from each other when a portion of the retention clip 40 is in a first position. The two curved portions of a first serpentine arm 80 are disposed a distance X' apart while two curved portions of the second serpentine arm 82 are disposed a distance X" apart when the retention clip 40 is flexed such that X">X>X'. In addition, the first base axis 54 and arm axes 84, 86 may be disposed in a nonlinear manner when the retention clip is in the second position.

The retention clip 40 may be provided with one or more portions. Multiple portions may be interconnected or provided in a sequence or series having a desired quantity or length. In the embodiment shown in FIG. 4, the retention clip 40 includes a first portion 100, a second portion 102, and a third portion 104. Adjacent portions may share a common retention portion 50. For instance, the first and second portions 100, 102 may both include or be interconnected by a common retention portion 50. Each portion 100, 102, 104 may be configured to be independently positioned or flexed.

Figure 5:
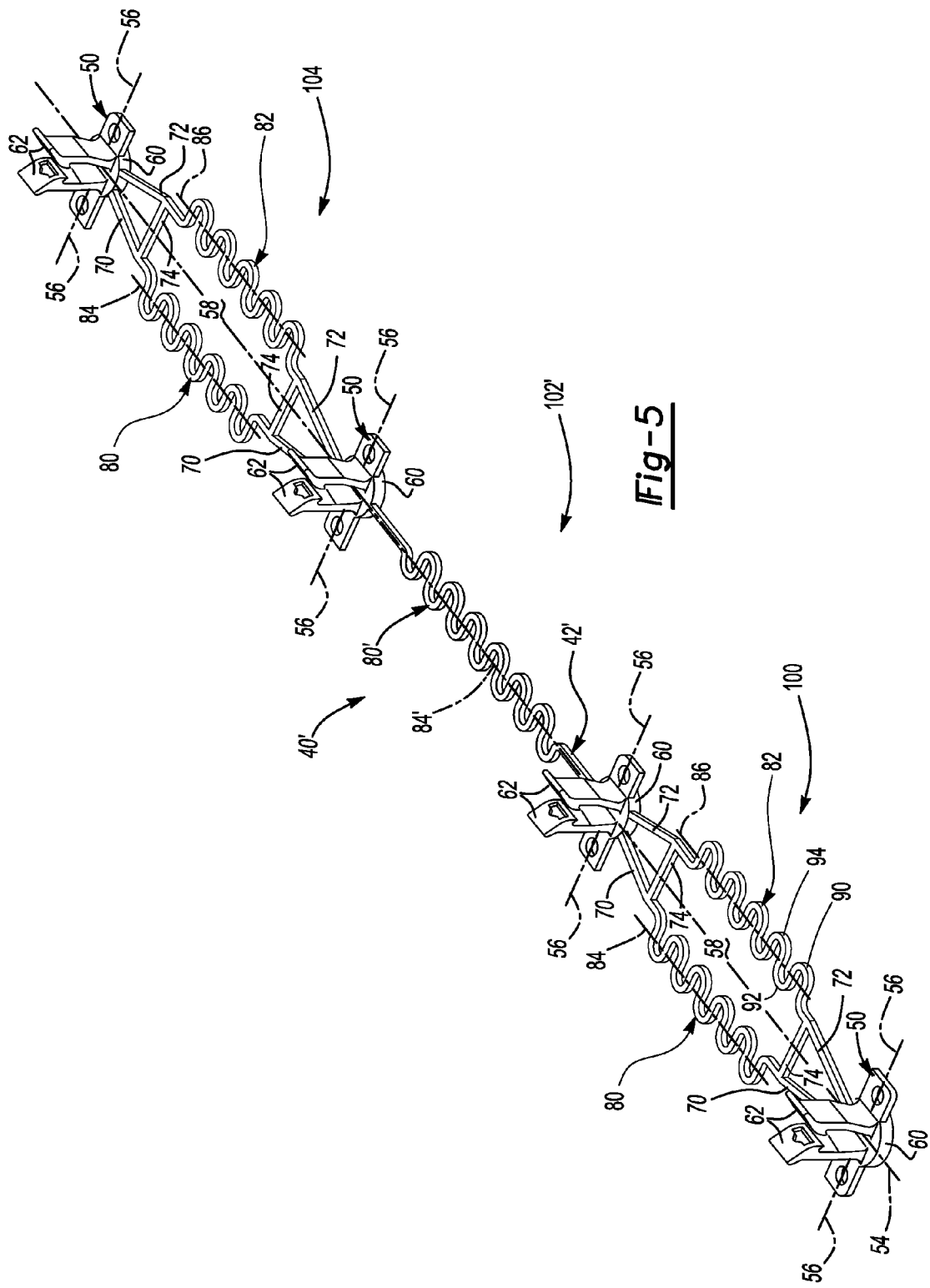
FIG. 5 is a perspective view of another embodiment of a retention clip.

Referring to FIG. 5, another embodiment of a retention clip 40' is shown. In this embodiment, the retention clip 40' or at least one portion 102' thereof may have a base 42' that includes a single serpentine arm 80' having a first arm axis 84'. The serpentine arm 80' may extend between different retention portions 50. As such, the first arm axis 84' may coincide with the first base axis 54.

The retention clip 40' may include multiple portions. The portions may have the same or different configurations. For instance, the retention clip 40' may have multiple portions that all have the same configuration as portion 102'. Alternatively, one or more portions may have the configuration of portion 100. The portions of the retention clip 40' may be provided in a repeating pattern. For instance, portions of the retention clip 40' may alternate between the configuration of portion 100 and portion 102'.

The retention clip 40, 40' may be provided with the cushion 20 during the cushion molding process. For example, the retention clips 40, 40' may be positioned in a mold and the cushion material may be injected, molded, and cured around the retention clip 40, 40' to secure the retention clip 40, 40' in a predetermined location in the cushion 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat trim assembly comprising:
   a retention clip including:
   first and second retention portions adapted to engage a trim cover assembly;
   first and second arms that extend from the first retention portion;
   a first connecting member that extends from the first arm to the second arm;
   third and fourth arms that extend from the second retention portion;
   a second connecting member that extends from the third arm to the fourth arm;
   a first serpentine arm that extends from the first arm to the third arm; and
   a second serpentine arm that extends from the second arm to the fourth arm;
   wherein the first and second serpentine arms have a set of curved regions that facilitate flexing of the retention clip.

2. The seat trim assembly of claim 1 wherein the first and second retention portions each include a pad and a retention feature that extends from the pad.

3. The seat trim assembly of claim 1 wherein a third serpentine arm extends from the first retention portion in a direction that extends away from the second retention portion.

4. The seat trim assembly of claim 1 wherein the first and second connecting members are spaced apart from the first and second retention portions, respectively.

5. The seat trim assembly of claim 1 wherein members of the set of curved regions are arranged in an alternating pattern in which adjacent curved regions are oriented in different directions.

6. The seat trim assembly of claim 1 wherein the set of curved regions includes a first member and a second member that face in opposite directions.

7. A seat trim assembly comprising:
   a cushion; and
   a retention clip disposed proximate the cushion, the retention clip including:
   first and second retention portions adapted to engage a trim cover assembly;
   first and second arms that extend from the first retention portion;
   third and fourth arms that extend from the second retention portion;
   a first serpentine arm that extends from the first arm to the third arm; and
   a second serpentine arm that extends from the second arm to the fourth arm;
   wherein the first and second serpentine arms each have a set of curved regions that facilitate flexing of the retention clip.

8. The seat trim assembly of claim 7 wherein the first and second serpentine arms are mirror images of each other with respect to a base axis that extends through the first and second retention portions.

9. The seat trim assembly of claim 7 wherein the first and second serpentine arms are spaced apart from and do not intersect a base axis that extends from the first retention portion to the second retention portion.

10. The seat trim assembly of claim 7 further comprising a first connecting member extending between the first and second arms.

11. The seat trim assembly of claim 7 wherein members of the set of curved regions are arranged in an alternating pattern in which adjacent curved regions face in different directions.

12. The seat trim assembly of claim 7 further comprising a trim cover assembly disposed over the cushion, wherein the first and second retention portions each include a retention feature that receives the trim cover assembly.

13. The seat trim assembly of claim 7 wherein the first retention portion includes a pad and the first and second serpentine arms are substantially coplanar with the pad.

14. A seat trim assembly comprising:
   a cushion having an opening; and
   a retention clip disposed in the opening, the retention clip having a first portion that includes:
   first and second pads disposed along a base axis;
   first and second retention features adapted to engage a trim cover, the first and second retention features extending from the first and second pads, respectively, and into the opening;
   first and second pairs of arms extending from the first and second pads, respectively; and
   first and second serpentine arms each having a set of curved portions, the first and second serpentine arms extending between the first and second pairs of arms;
   wherein at least some members of the set of curved portions of the first serpentine arm are configured to be disposed closer together than members of the set of curved portions of the second serpentine arm when the base axis is disposed along an arc.

15. The seat trim assembly of claim 14 wherein the set of curved portions of the first serpentine arm are disposed closer together than the set of curved portions of the second serpentine arm when the first portion is disposed along a curve.

16. The seat trim assembly of claim 14 wherein the set of curved portions of the first serpentine arm includes a first curved portion and a second curved portion extending from the first curved portion, wherein the first and second curved portions face in opposite directions.

17. The seat trim assembly of claim 16 wherein the first curved portion extends from a first end of the second curved portion.

18. The seat trim assembly of claim 17 further comprising a third curved portion, wherein the third curved portion extends from a second end of the second curved portion that is disposed opposite the first end.

19. The seat trim assembly of claim 18 wherein the first and third curved portions are disposed further away from the base axis than the second curved portion.

20. The seat trim assembly of claim 14 wherein the retention clip further comprises a second portion having substantially the same configuration as the first portion, wherein the second portion and the first portion both include and extend from the first pad.

* * * * *